(12) United States Patent
Ballesteros

(10) Patent No.: US 9,325,383 B2
(45) Date of Patent: Apr. 26, 2016

(54) COMMUNICATIONS TECHNIQUES FOR A SECURE NEAR FIELD COMMUNICATION ARCHITECTURE

(71) Applicant: Miguel Ballesteros, Roseville, CA (US)

(72) Inventor: Miguel Ballesteros, Roseville, CA (US)

(73) Assignee: INTEL CORPORATION, Santa Clara, CA (US)

( * ) Notice: Subject to any disclaimer, the term of this patent is extended or adjusted under 35 U.S.C. 154(b) by 93 days.

(21) Appl. No.: 14/129,945

(22) PCT Filed: Aug. 12, 2013

(86) PCT No.: PCT/US2013/054575
§ 371 (c)(1),
(2) Date: Dec. 28, 2013

(87) PCT Pub. No.: WO2015/023254
PCT Pub. Date: Feb. 19, 2015

(65) Prior Publication Data
US 2015/0236756 A1    Aug. 20, 2015

(51) Int. Cl.
*H04W 12/08*    (2009.01)
*H04B 5/00*    (2006.01)

(52) U.S. Cl.
CPC .................................. *H04B 5/0031* (2013.01)

(58) Field of Classification Search
CPC ..................................................... H04W 12/08
USPC ................................................ 455/41.1, 41.2
See application file for complete search history.

(56) References Cited

U.S. PATENT DOCUMENTS 9,020,423 B2* 4/2015 Naniyat et al. ............... 455/41.1
2011/0124285 A1* 5/2011 Teruyama .................... 455/41.1

* cited by examiner

*Primary Examiner* — Tuan H Nguyen
(74) *Attorney, Agent, or Firm* — Kacvinsky Daisak Bluni PLLC

(57) ABSTRACT

Communication techniques for a secure near field communication (NFC) architecture are described. In one embodiment, for example, a wireless communications device may comprise a processor circuit, an application processor (AP) for execution on the processor circuit to generate a near field communication controller interface (NCI) packet, a secure element (SE) to wrap the NCI packet in a host controller protocol (HCP) packet, and an NFC controller to receive the HCP packet, the NFC controller comprising a tunneling module to obtain the NCI packet by unwrapping the HCP packet. Other embodiments are described and claimed.

25 Claims, 9 Drawing Sheets

*PRIOR ART*

COMMUNICATIONS TECHNIQUES FOR A SECURE NEAR FIELD COMMUNICATION ARCHITECTURE

TECHNICAL FIELD

Embodiments described herein generally relate to wireless communications using near field communication techniques.

BACKGROUND

Near field communication (NFC) is a set of communications protocols that enable compatible devices to establish radio frequency (RF) communication with each other when they touch or are brought into very close proximity. Typically, NFC devices comprise an NFC controller, an application processor (AP), and a secure element (SE). In a conventional NFC device comprising an NFC controller-centric architecture, the AP communicates directly with the NFC controller using NFC controller interface (NCI) packets, and the NFC controller communicates directly with the SE using host controller protocol (HCP) packets.

In a device comprising a secure, SE-centric NFC architecture, the connection between the AP and the NFC controller is omitted, and communications between the AP and the NFC controller must occur by way of the SE. In order to communicate with the AP, the NFC controller must convey the information in AP-destined NCI packets to the SE using HCP packets, and vice versa.

DETAILED DESCRIPTION

Figure 1:
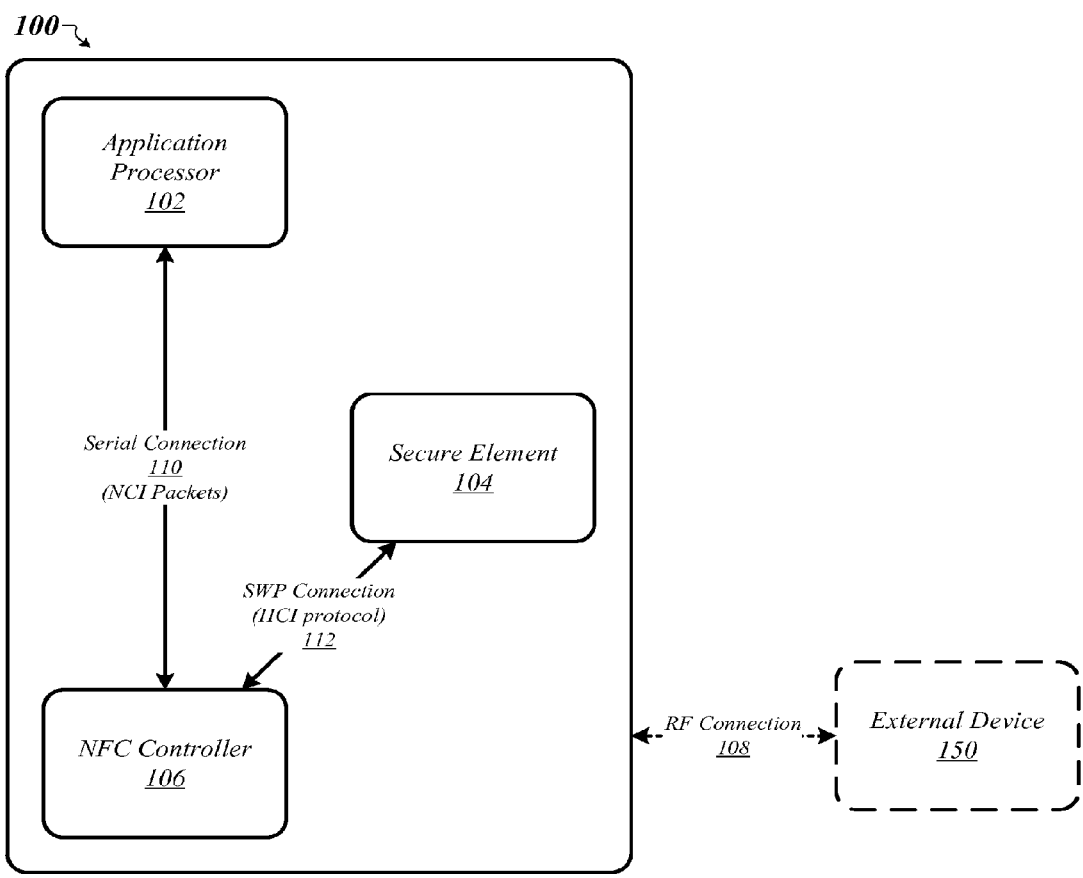
FIG. 1 illustrates an embodiment of a first device.

FIG. 1 illustrates a block diagram of a device 100 comprising a conventional, NFC controller-centric architecture. As shown in FIG. 1, device 100 comprises an application processor 102, a secure element 104, and an NFC controller 106. In general operation, device 100 is operative to establish an RF connection 108 with an external device 150 using an NFC protocol. For example, device 100 and external device 150 may establish RF connection 108 using an NFC protocol when they are brought into contact or very close proximity to each other. Such an NFC protocol may be defined by one or more standards, such as International Organization for Standardization/International Electrotechnical Commission (ISO/IEC) standard 18092:2013 published Mar. 7, 2013 (NFCIP-1), ISO/IEC standard 21481:2012 published Jun. 25, 2013 (NFCIP-2), any predecessors and/or successors thereof, one or more standards promulgated by the NFC Forum, and/or one or more other NFC standards. The embodiments are not limited in this context.

In typical NFC devices such as example device 100, application processor 102 implements and/or manages applications that utilize NFC capabilities and/or connections, NFC controller 106 implements and/or manages the NFC capabilities and/or connections, and secure element 104 securely stores identification, authentication, and/or authorization information for device 100. In the conventional architecture of FIG. 1, applications processor 102 communicates with NFC controller 106 by exchanging NFC controller interface (NCI) packets over a serial connection 110. Examples of serial connection 110 may include an inter-integrated circuit (I2C) bus, a serial peripheral interface (SPI) bus, and a universal asynchronous receiver/transmitter (UART) connection. NFC controller 106 communicates with secure element 104 over a single wire protocol (SWP) connection 112 according to a host controller interface (HCI) protocol. Application processor 102 and secure element 104 communicate with each other through NFC controller 106, using serial connection 110 and SWP connection 112.

Figure 2:
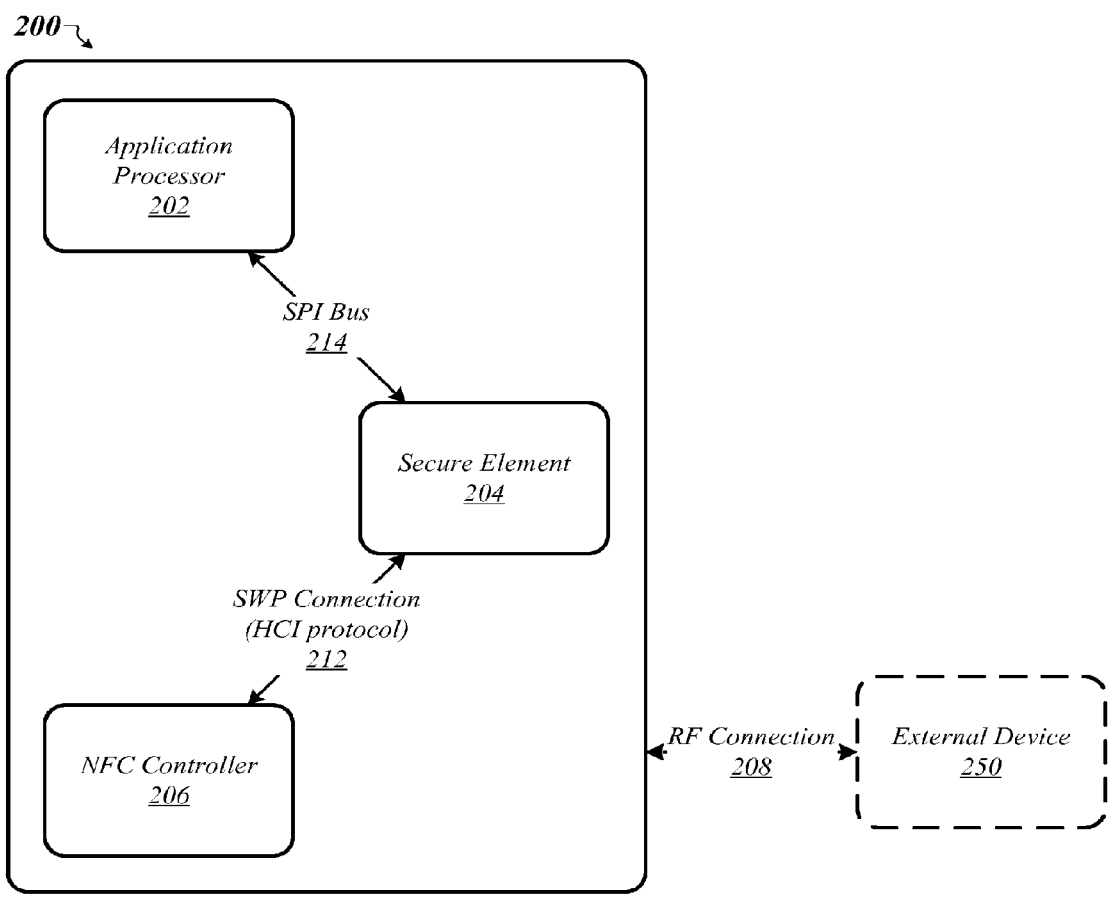
FIG. 2 illustrates an embodiment of a second device.

FIG. 2 illustrates a block diagram of a device 200 comprising a secure, SE-centric architecture, such as may be utilized in various embodiments. Similar to device 100 of FIG. 1, device 200 of FIG. 2 comprises an application processor (AP) 202, a secure element (SE) 204, and an NFC controller 206, and is operative to establish an RF connection 208 with an external device 250 using an NFC protocol. However, in the secure, SE-centric architecture of FIG. 2, the serial connection between AP 202 and NFC controller 206 is omitted or not utilized, in order to employ SE 204 as an intermediary to prevent potentially malicious commands and/or data at AP 202 from directly accessing NFC controller 206, and vice-versa. AP 202 must therefore communicate with NFC controller 206 via SE 204. More particularly, AP 202 communicates with SE 204 over a serial protocol interface (SPI) bus 214, and SE 204 communicates with NFC controller 206 over SWP connection 212. However, AP 202 conventionally communicates with NFC controller 206 using NCI packets, while the SWP connection 212 between SE 204 and NFC controller 206 utilizes a host controller interface (HCI) protocol. This mismatch may be addressed by utilizing techniques for conveying NCI packets over an SWP connection implementing an HCI protocol.

Various embodiments are generally directed to communication techniques for a secure near field communication architecture. More particularly, various embodiments are directed to techniques for enabling an application processor (AP) to communicate with a near field communication (NFC) controller in a secure NFC architecture in which the AP and the NFC controller are not able to directly exchange NFC controller interface (NCI) packets. In one embodiment, for example, a wireless communications device may comprise a processor circuit, an application processor (AP) for execution on the processor circuit to generate a near field communication controller interface (NCI) packet, a secure element (SE) to wrap the NCI packet in a host controller protocol (HCP) packet, and an NFC controller to receive the HCP packet, the NFC controller comprising a tunneling module to obtain the NCI packet by unwrapping the HCP packet. Other embodiments may be described and claimed.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrases "in one embodiment," "in some embodiments," and "in various embodiments" in various places in the specification are not necessarily all referring to the same embodiment.

Figure 3:
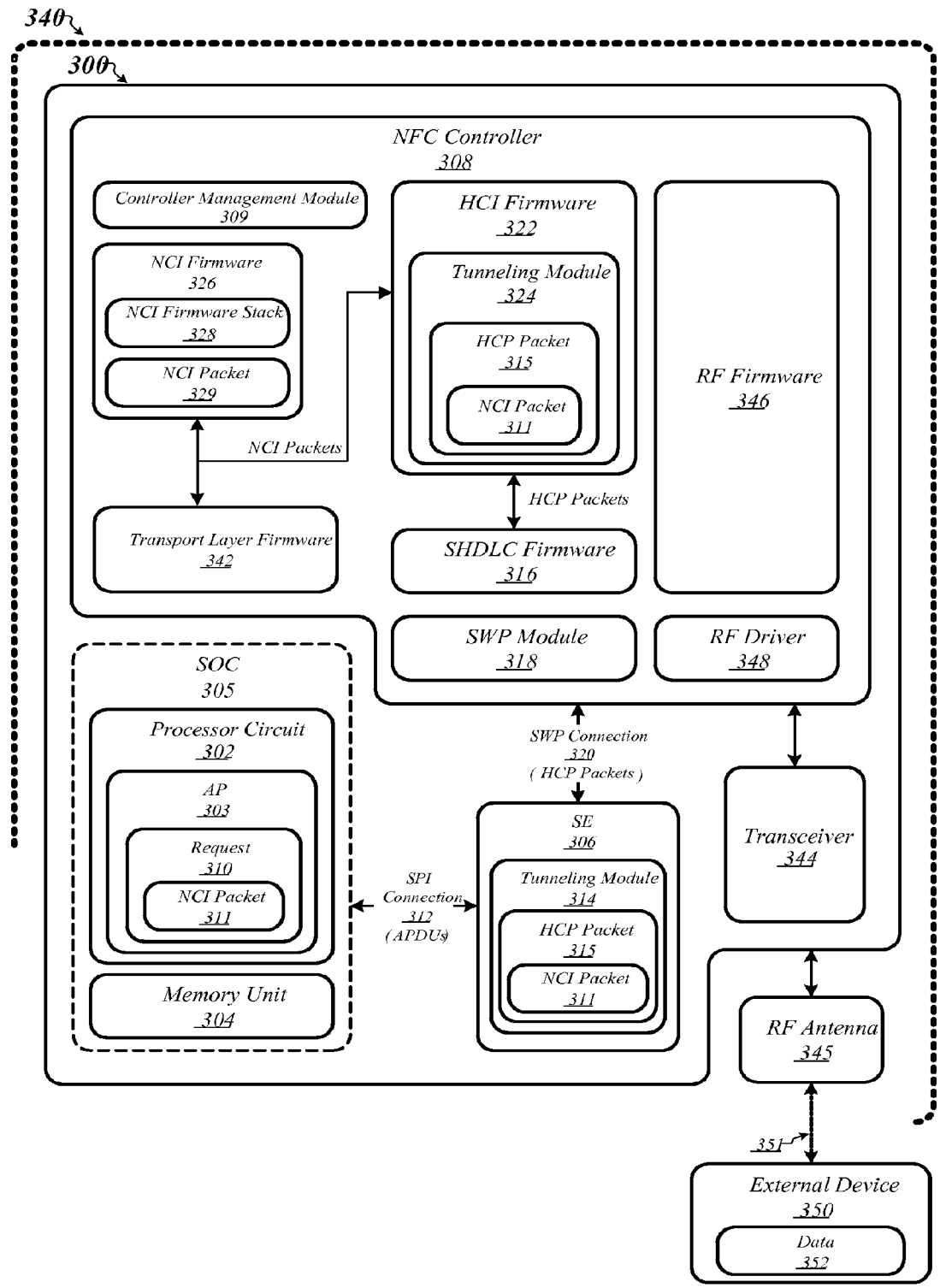
FIG. 3 illustrates an embodiment of a third device and an embodiment of a first system.

FIG. 3 illustrates a block diagram of a device 300 comprising a secure, SE-centric architecture. More particularly, device 300 comprises a device in which NCI packets are conveyed over an SWP connection implementing an HCI protocol. As shown in FIG. 3, device 300 comprises multiple elements, including a processor circuit 302, a memory unit 304, an SE 306, an NFC controller 308, and a transceiver 344. The embodiments, however, are not limited to the type, number, or arrangement of elements shown in this figure. In various embodiments, device 300 may comprise a handheld device, such as a smart phone, a tablet computer, an electronic reading device, a personal digital assistant, or an electronic navigation device such as a global positioning system (GPS) device. In some other embodiments, device 300 may comprise a non-handheld device, such as a laptop or desktop computer, a monitor, a smart television, or another type of television. The embodiments are not limited to these examples.

In various embodiments, device 300 may comprise processor circuit 302. Processor circuit 302 may be implemented using any processor or logic device, such as a complex instruction set computer (CISC) microprocessor, a reduced instruction set computing (RISC) microprocessor, a very long instruction word (VLIW) microprocessor, an x86 instruction set compatible processor, a processor implementing a combination of instruction sets, a multi-core processor such as a dual-core processor or dual-core mobile processor, or any other microprocessor or central processing unit (CPU). Processor circuit 302 may also be implemented as a dedicated processor, such as a controller, a microcontroller, an embedded processor, a chip multiprocessor (CMP), a co-processor, a digital signal processor (DSP), a network processor, a media processor, an input/output (I/O) processor, a media access control (MAC) processor, a radio baseband processor, an application specific integrated circuit (ASIC), a field programmable gate array (FPGA), a programmable logic device (PLD), and so forth. In one embodiment, for example, processor circuit 302 may be implemented as a general purpose processor, such as a processor made by Intel® Corporation, Santa Clara, Calif. The embodiments are not limited in this context.

In some embodiments, processor circuit 302 may be operative to implement an application processor (AP) 303. AP 303 may comprise logic, circuitry, and/or instructions operative to implement and/or manage applications that utilize NFC capabilities and/or connections of device 300. In various embodiments, AP 303 may comprise an operating system. In some embodiments in which device 300 comprises a handheld device, AP 303 may comprise an operating system designed for handheld devices, such as an Android™, iOS™, or Windows Phone™ operating system. The embodiments are not limited in this context.

In various embodiments, device 300 may comprise or be arranged to communicatively couple with a memory unit 304. Memory unit 304 may be implemented using any machine-readable or computer-readable media capable of storing data, including both volatile and non-volatile memory. For example, memory unit 304 may include read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. It is worthy of note that some portion or all of memory unit 304 may be included on the same integrated circuit as processor circuit 302, or alternatively some portion or all of memory unit 304 may be disposed on an integrated circuit or other medium, for example a hard disk drive, that is external to the integrated circuit of processor circuit 302. Although memory unit 304 is comprised within device 300 in FIG. 3, memory unit 304 may be external to device 300 in some embodiments. In some other embodiments, device 300 may comprise a system-on-a-chip (SOC) 305, and one or both of processor circuit 302 and memory unit 304 may be comprised within the SOC 305. The embodiments are not limited in this context.

In various embodiments, device 300 may comprise SE 306. SE 306 may comprise circuitry that securely stores identification, authentication, and/or authorization information for device 300. In some embodiments, SE 306 may comprise an embedded chip such as an embedded secure element (eSE). In various other embodiments, SE 306 may comprise a card such as a universal integrated circuit card (UICC) or a secure digital (SD) card. The embodiments are not limited to these examples.

In some embodiments, device 300 may comprise NFC controller 308. NFC controller 308 may comprise circuitry that implements and/or manages NFC capabilities and/or connections for device 300. In various embodiments, NFC controller 308 may comprise a discrete controller chip or integrated circuit. In some other embodiments, NFC controller 308 may comprise circuitry on a printed circuit board (PCB) or other substrate. The embodiments are not limited in this context.

In some embodiments, NFC controller 308 may comprise controller management module 309. Controller management module 309 may comprise logic, circuitry, and/or instructions operative to perform configuration and/or management operations for NFC controller 308. In various embodiments, such configuration and/or management operations may include configuring, managing, and/or updating one or more firmware components of NFC controller 308, examples of which are discussed below. The embodiments are not limited in this context.

In some embodiments, NFC controller 308 may comprise transport layer firmware 342. Transport layer firmware 342 may comprise persistent memory containing code, logic, data, and/or instructions operative to support communications over one or more serial connections, such as an I2C bus, an SPI bus, and/or a UART connection. Transport layer firmware 342 may provide legacy support for use of NFC controller 308 in a conventional architecture in which it connects to AP 303 via such a serial connection. However, in various embodiments, a secure, SE-centric architecture may be employed in which this support is not utilized and no serial connection exists between NFC controller 308 and AP 303. The embodiments are not limited in this context.

In various embodiments, device 300 may comprise transceiver 344. In various embodiments, device 300 may include a transceiver 344. Transceiver 344 may include one or more radios capable of transmitting and receiving signals using near field communication techniques. In some embodiments, transceiver 344 may additionally or alternatively enable communication using various other wireless communications techniques. Such other techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, transceiver 344 may operate in accordance with one or more applicable standards in any version. The embodiments are not limited in this context.

In some embodiments, NFC controller 308 may comprise RF firmware 346. RF firmware 346 may comprise persistent memory containing code, logic, data, and/or instructions operative to provide data link layer support for RF communications. In some embodiments, NFC controller 308 may comprise RF driver 348. RF driver 348 may comprise logic, circuitry, and/or instructions operative to provide physical layer support for RF communications. In various embodiments, RF firmware 346 and RF driver 348 may collectively provide data link layer and physical layer support for RF communication with an external device 350 using transceiver 344. For example, in some embodiments, RF firmware 346 and RF driver 348 may collectively provide data link layer and physical layer support for communication with external device 350 over an RF connection 351 established using an NFC protocol. The embodiments are not limited in this context.

FIG. 3 also illustrates a block diagram of a system 340. System 340 may comprise any of the aforementioned elements of device 300. System 340 may further comprise an RF antenna 345. RF antenna 345 may comprise any antenna, combination of antennas, or antenna array suitable for RF communications. In various embodiments, device 300 may conduct RF communications with an external device 350 using RF antenna 345. For example, in some embodiments, NFC controller 308 may be coupled to RF antenna 345, which may receive data from a remote device such as external device 350 via RF connection 351. The embodiments are not limited in this context.

In general operation, device 300 may be operative to establish RF connection 351 with external device 350 using an NFC protocol when brought into contact or close proximity to external device 350. During operation, SE 306 may be utilized as an intermediary between AP 303 and NFC controller 308, and may be operative to control or regulate the types of NFC transactions that AP 303 is able to invoke. For example, SE 306 may restrict and/or prohibit access by AP 303 to sensitive data received by NFC controller 308 from external device 350. This arrangement may help to prevent access by malicious code at AP 303 to sensitive data received at NFC controller 308 from external device 350. For example, a virus at AP 303 may be unable to access sensitive data at NFC controller 308 because SE 306 may implement security rules that prohibit AP 303 from invoking NFC transactions needed to obtain that sensitive data from NFC controller 308. The embodiments are not limited to this example.

In various embodiments, in order to enable the use of SE 306 as an intermediary, NFC controller 308 may be operative to wrap or encapsulate NCI packets in HCP packets for transmission to SE 306, and/or to unwrap or decapsulate HCP packets received from SE 306 to obtain NCI packets comprised within those received HCP packets. Likewise, SE 306 may be operative to wrap or encapsulate NCI packets in HCP packets for transmission to NFC controller 308, and/or to unwrap or decapsulate HCP packets received from NFC controller 308 to obtain NCI packets for forwarding to AP 303. In some embodiments, wrapping or encapsulating the NCI packets within HCP packets may comprise including the NCI packets in payload fields of the HCP packets. The embodiments are not limited in this context.

In various embodiments, device 300 may be operative to establish RF connection 351 with external device 350 using an NFC protocol. In some embodiments, device 300 may receive data 352 from external device 350 over RF connection 351. Data 352 may comprise information, instructions, logic, commands, and/or any other type of data. In various embodiments, NFC controller 308 may receive data 352 via transceiver 344 and RF connection 351. The embodiments are not limited in this context.

In some embodiments, AP 303 may be operative to generate a request 310 to access received data 352. In various embodiments, request 309 may contain an NCI packet 311 comprising an instruction for invoking one or more NFC transactions. In some such embodiments, NCI packet 311 may comprise an instruction for invoking one or more NFC transactions to obtain data 352 from NFC controller 308. In various embodiments, request 310 may comprise an application protocol data unit (APDU), and AP 303 may be operative to wrap or encapsulate the NCI packet 311 within the APDU. In some embodiments, AP 303 may be operative to send the request 310 to SE 306 over SPI connection 312. It is worthy of note that although request 310 may comprise a request to access received data 352, the embodiments are not limited to this example. In various embodiments, request 310 may alternatively or additionally comprise a request to access other data residing at NFC controller 308, and/or to command, control, and/or utilize capabilities of NFC controller 308. The embodiments are not limited in this context.

In some embodiments, SE 306 may be operative to receive request 310 from AP 303 over SPI connection 312. In various embodiments in which request 310 comprises an APDU, SE 306 may be operative to unwrap or decapsulate the APDU to obtain NCI packet 311. In some embodiments, SE 306 may be operative to evaluate request 310 based on one or more security rules to determine whether request 310 should be granted or denied. In various embodiments, SE 306 may be operative to determine that request 310 should be denied if it comprises an attempt to invoke NFC transactions to which access on the part of AP 303 is prohibited, and otherwise may be operative to determine that request 310 should be granted. In some embodiments, SE 306 may be operative to determine whether request 310 should be granted or denied by analyzing NCI packet 311. In various embodiments, for example, SE 306 may be operative to determine whether forwarding NCI packet 311 to NFC controller 308 will invoke one or more NFC transactions to which access on the part of AP 303 is prohibited. In some embodiments, when SE 306 determines that request 310 should be denied, it may determine that NCI packet 311 should not be forwarded to NFC controller 308. In various embodiments, when SE 306 determines that request 310 should be granted, it may determine that NCI packet 311 should be forwarded to NFC controller 308. The embodiments are not limited in this context.

In some embodiments, SE 306 may comprise a tunneling module 314. Tunneling module 314 may comprise logic, circuitry, and/or instructions operative to wrap and unwrap NCI packets within HCP packets. In various embodiments, tunneling module 314 may support one or more generic HCP command sets. In some embodiments, for example, tunneling module 314 may support the "ANY_SET/GET_PARAMETER," "ANY_OPEN/CLOSE_PIPE," and "EVT_POST_DATA" command sets. In various embodiments, when SE 306 determines that NCI packet 311 should be forwarded to NFC controller 308, it may be operative wrap NCI packet 311 in an HCP packet 315 using tunneling module 314. The embodiments are not limited in this context.

In various embodiments, NFC controller 308 may comprise simplified high level data link control (SHDLC) firmware 316. SHDLC firmware 316 may comprise persistent memory containing code, logic, data, and/or instructions operative to enable data link layer communications according to an SHDLC protocol. In some embodiments, NFC controller 308 may comprise SWP module 318. SWP module 318 may comprise logic, circuitry, and/or instructions operative to enable physical layer communications according to an SWP protocol. In various embodiments, SWP module 318 may comprise an SWP master driver. In some embodiments, SHDLC firmware 316 and SWP module 318 may provide data link layer and physical layer support for the exchange of HCP packets between NFC controller 308 and SE 306 over an SWP connection 320. In some embodiments, SE 306 may be operative to send HCP packet 315 to NFC controller 308 over SWP connection 320. In some embodiments, device 300 may support a factory configuration option than enables SWP connection to be automatically activated, without host intervention. The embodiments are not limited in this context.

In various embodiments, NFC controller 308 may comprise HCI firmware 322. HCI firmware 322 may comprise persistent memory containing code, logic, data, and/or instructions operative to process received HCP packets and/or operative to generate HCP packets. In some embodiments, HCI firmware 322 may comprise tunneling module 324. Tunneling module 324 may comprise logic, circuitry, and/or instructions operative to wrap and unwrap NCI packets within HCP packets. In various embodiments, tunneling module 324 may comprise a proprietary gate. In some other embodiments, tunneling module 324 may comprise a generic gate. In various embodiments, tunneling module 324 may support one or more generic HCP command sets. In some embodiments, for example, tunneling module 324 may support the "ANY_SET/GET_PARAMETER," "ANY_OPEN/CLOSE_PIPE," and "EVT_POST_DATA" command sets. The embodiments are not limited in this context.

In some embodiments, NFC controller 308 may comprise NCI firmware 326. NCI firmware 326 may comprise persistent memory containing code, logic, data, and/or instructions operative to process received NCI packets and/or operative to generate NCI packets. In various embodiments, NCI firmware 326 may comprise NCI firmware stack 328. In some embodiments, NCI firmware stack 328 may comprise a stack into which received NCI packets are placed for further processing, such as to extract information, data, and/or instructions contained within those received NCI packets. The embodiments are not limited in this context.

In various embodiments, when SE 306 sends HCP packet 315 to NFC controller 308 over SWP connection 320, HCI firmware 322 may be operative to receive HCP packet 315. In some embodiments, tunneling module 324 may then be operative to unwrap HCP packet 315 to obtain NCI packet 311, and HCI firmware 322 may then send NCI packet 311 to NCI firmware 326. In various embodiments, once it receives NCI packet 311, NCI firmware 326 may be operative to add it to NCI firmware stack 328 for further processing. In various embodiments, the further processing may comprise invoking one or more NFC transactions at NFC controller 308. The embodiments are not limited in this context.

In some embodiments, NFC controller 308 may be operative on NCI firmware 326 to generate an NCI packet 329. NCI packet 329 may comprise data, information, commands, and/or instructions for transmission to AP 303. In various embodiments, NCI packet 329 may be generated by the invocation of one or more NFC transactions in response to NCI packet 311. For example, when request 310 comprises a request to access data 352, NCI packet 329 may comprise some or all of data 352 and may be generated for transmission to AP 303 in response to request 310. In some other embodiments, NCI packet 329 may be unrelated to request 310. The embodiments are not limited in this context.

In various embodiments, HCI firmware 322 may be operative to receive NCI packet 329 from NCI firmware 326, and tunneling module 324 may be operative to wrap NCI packet 329 within an HCP packet. The HCP packet in which NCI packet 329 is wrapped may then be transmitted to SE 306 over SWP connection 320. At SE 306, tunneling module 314 may be operative to unwrap the HCP packet to obtain NCI packet 329, and SE 306 may be operative to determine whether the NCI packet 329 should be forwarded to AP 303, based on one or more security rules. If SE 306 determines that NCI packet 329 should be forwarded to AP 303, it may be operative to send an APDU comprising NCI packet 329 to AP 303 over SPI connection 312. AP 303 may then be operative to unwrap NCI packet 329 from the APDU and pass NCI packet 329 on to an NCI stack for further processing. The embodiments are not limited in this context.

Operations for the above embodiments may be further described with reference to the following figures and accompanying examples. Some of the figures may include a logic flow. Although such figures presented herein may include a particular logic flow, it can be appreciated that the logic flow merely provides an example of how the general functionality as described herein can be implemented. Further, the given logic flow does not necessarily have to be executed in the order presented unless otherwise indicated. In addition, the given logic flow may be implemented by a hardware element, a software element executed by a processor, or any combination thereof. The embodiments are not limited in this context.

Figure 4:
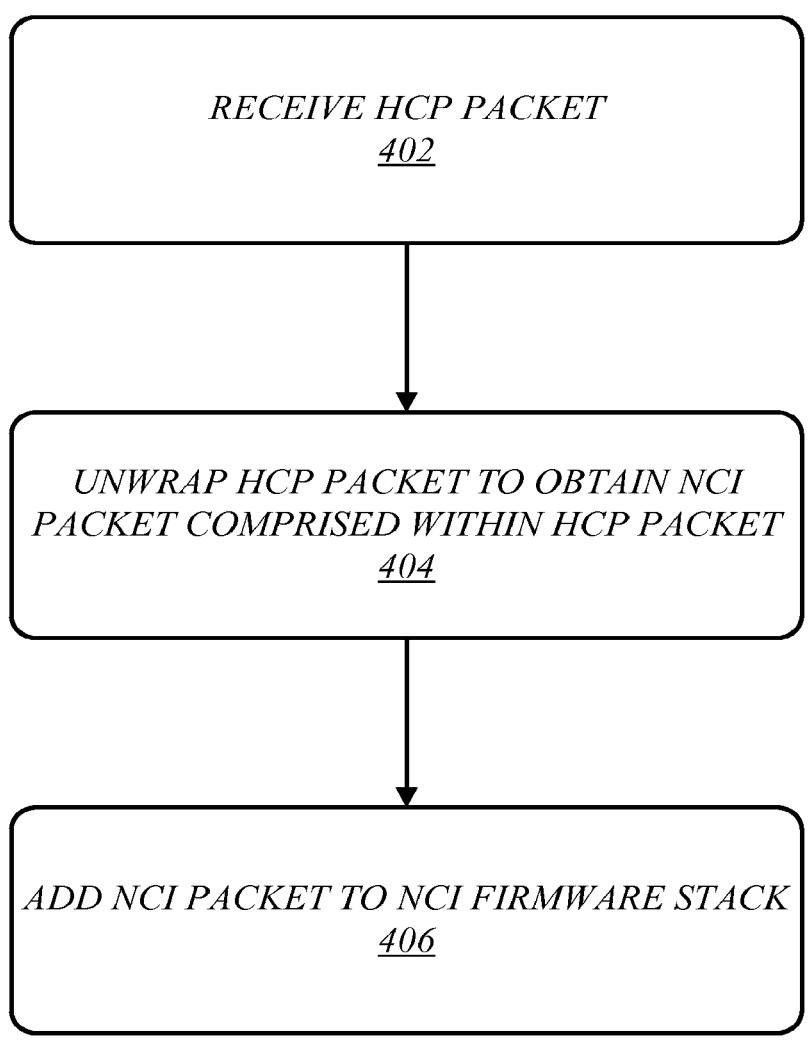
FIG. 4 illustrates an embodiment of a first logic flow.

FIG. 4 illustrates one embodiment of a logic flow 400, which may be representative of the operations executed by one or more embodiments described herein. As shown in logic flow 400, an HCP packet may be received at 402. For example, NFC controller 308 of FIG. 3 may receive HCP packet 315 via SWP connection 320, and NCI packet 311 may be wrapped within HCP packet 315. At 404, the HCP packet may be unwrapped to obtain an NCI packet comprised within the HCP packet. For example, tunneling module 324 of FIG. 3 may unwrap HCP packet 315 to obtain NCI packet 311. At 406, the NCI packet may be added to an NCI firmware stack. For example, HCI firmware 322 of FIG. 3 may send the NCI packet 311 to NCI firmware 326, which may add it to NCI firmware stack 328. The embodiments are not limited to these examples.

Figure 5:
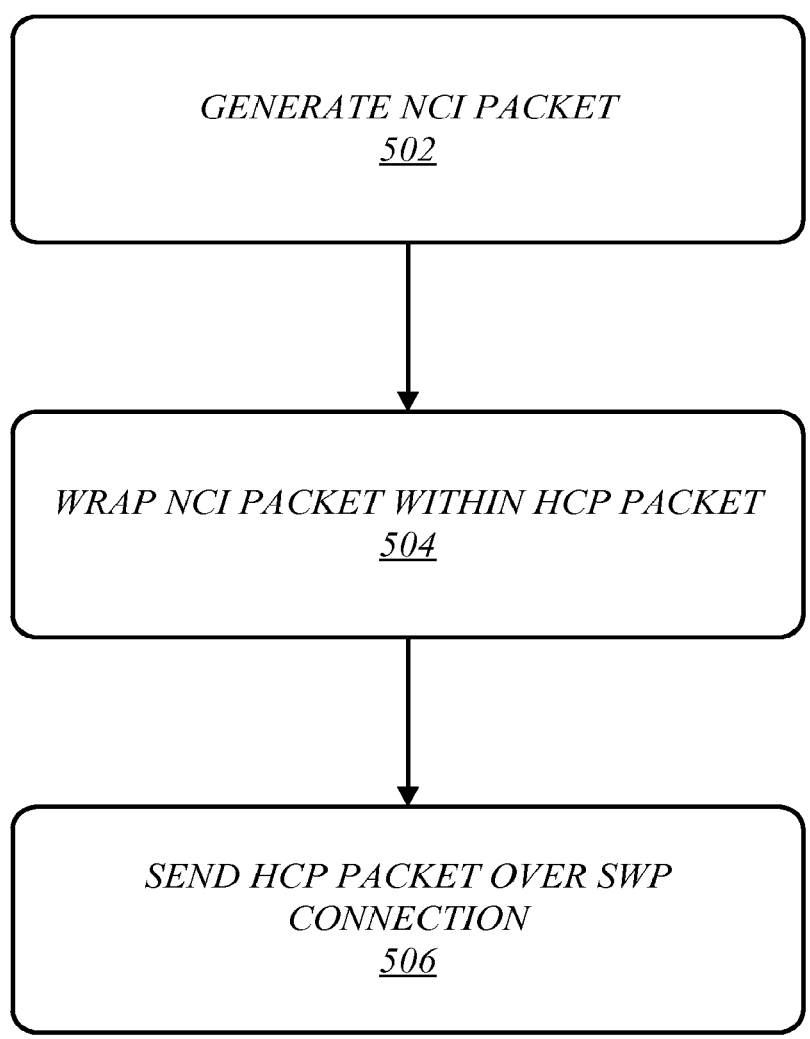
FIG. 5 illustrates an embodiment of a second logic flow.

FIG. 5 illustrates one embodiment of a logic flow 500, which may be representative of the operations executed by one or more embodiments described herein. As shown in logic flow 500, an NCI packet may be generated at 502. For example, AP 303 of FIG. 3 may generate NCI packet 311. At 504, the NCI packet may be wrapped within an HCP packet. For example, SE 306 of FIG. 3 may receive request 310 comprising NCI packet 311 from AP 303 over SPI connection 312, and tunneling module 314 may wrap NCI packet 311 within HCP packet 315. At 506, the HCP packet may be sent over an SWP connection. For example, SE 306 of FIG. 3 may be operative to send HCP packet 315 to NFC controller 308 over SWP connection 320. The embodiments are not limited to these examples.

Figure 6:
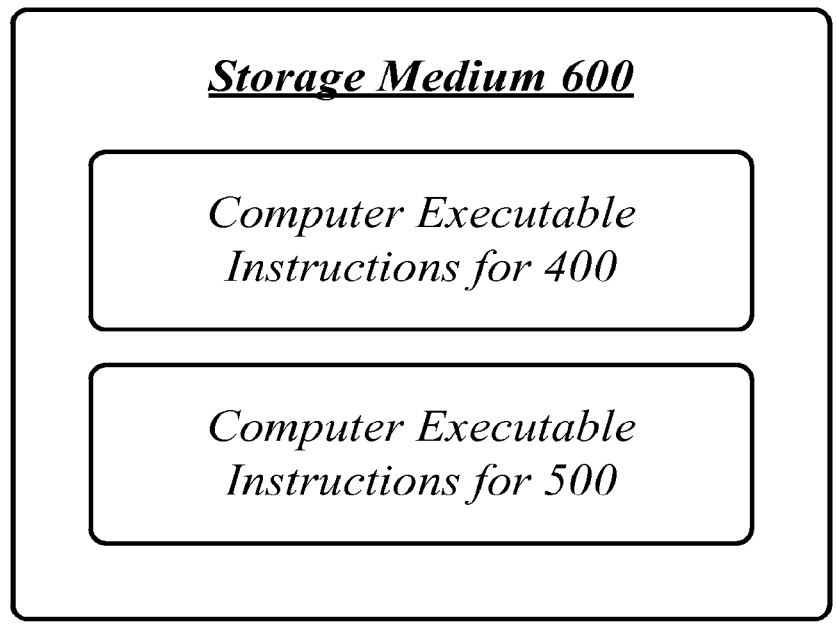
FIG. 6 illustrates an embodiment of a storage medium.

FIG. 6 illustrates an embodiment of a storage medium 600. The storage medium 600 may comprise an article of manufacture. In one embodiment, the storage medium 600 may comprise any non-transitory computer readable medium or machine readable medium, such as an optical, magnetic or semiconductor storage. The storage medium may store various types of computer executable instructions, such as instructions to implement logic flow 400 of FIG. 4 and/or logic flow 500 of FIG. 5. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The embodiments are not limited in this context.

Figure 7:
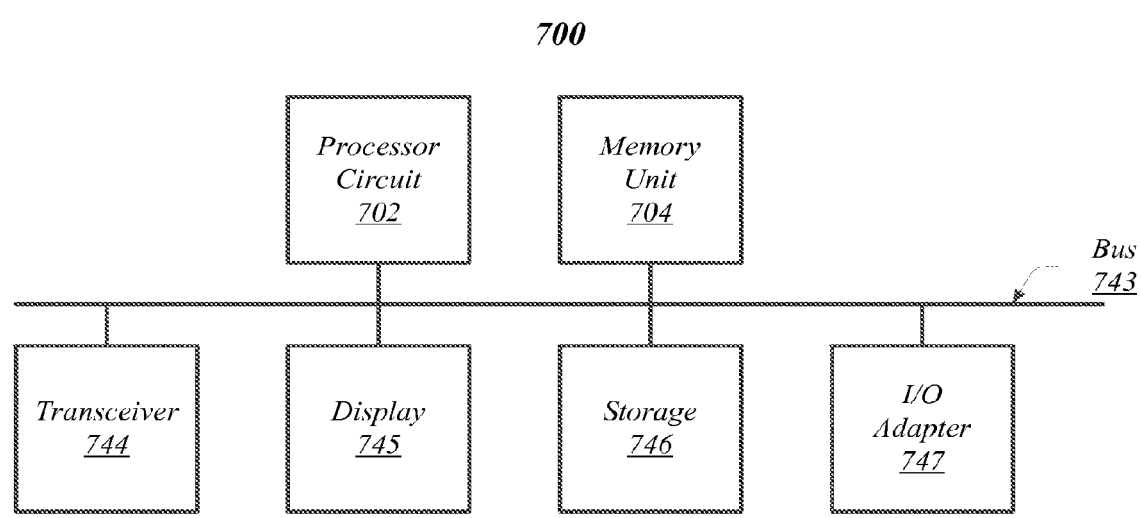
FIG. 7 illustrates an embodiment of a second system.

FIG. 7 illustrates one embodiment of a system 700. In various embodiments, system 700 may be representative of a system or architecture suitable for use with one or more embodiments described herein, such as device 300 of FIG. 3, logic flow 400 of FIG. 4, logic flow 500 of FIG. 5, and/or storage medium 600 of FIG. 6. The embodiments are not limited in this respect.

As shown in FIG. 7, system 700 may include multiple elements. One or more elements may be implemented using one or more circuits, components, registers, processors, software subroutines, modules, or any combination thereof, as desired for a given set of design or performance constraints. Although FIG. 7 shows a limited number of elements in a certain topology by way of example, it can be appreciated that more or less elements in any suitable topology may be used in system 700 as desired for a given implementation. The embodiments are not limited in this context.

In various embodiments, system 700 may include a processor circuit 702. Processor circuit 702 may be implemented using any processor or logic device, and may be the same as or similar to processor circuit 302 of FIG. 3.

In one embodiment, system 700 may include a memory unit 704 to couple to processor circuit 702. Memory unit 704 may be coupled to processor circuit 702 via communications bus 743, or by a dedicated communications bus between processor circuit 702 and memory unit 704, as desired for a given implementation. Memory unit 704 may be implemented using any machine-readable or computer-readable media capable of storing data, including both volatile and non-volatile memory, and may be the same as or similar to memory unit 304 of FIG. 3. In some embodiments, the machine-readable or computer-readable medium may include a non-transitory medium. The embodiments are not limited in this context.

In various embodiments, system 700 may include a transceiver 744. Transceiver 744 may include one or more radios capable of transmitting and receiving signals using various suitable wireless communications techniques, and may be the same as or similar to transceiver 344 of FIG. 3.

In various embodiments, system 700 may include a display 745. Display 745 may comprise any display device capable of displaying information received from processor circuit 702. Examples for display 745 may include a television, a monitor, a projector, and a computer screen. In one embodiment, for example, display 745 may be implemented by a liquid crystal display (LCD), light emitting diode (LED) or other type of suitable visual interface. Display 745 may comprise, for example, a touch-sensitive color display screen. In various implementations, display 745 may comprise one or more thin-film transistors (TFT) LCD including embedded transistors. The embodiments are not limited in this context.

In various embodiments, system 700 may include storage 746. Storage 746 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 746 may include technology to increase the storage performance enhanced protection for valuable digital media when multiple hard drives are included, for example. Further examples of storage 746 may include a hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of DVD devices, a tape device, a cassette device, or the like. The embodiments are not limited in this context.

In various embodiments, system 700 may include one or more I/O adapters 747. Examples of I/O adapters 747 may include Universal Serial Bus (USB) ports/adapters, IEEE 1394 Firewire ports/adapters, and so forth. The embodiments are not limited in this context.

Figure 8:
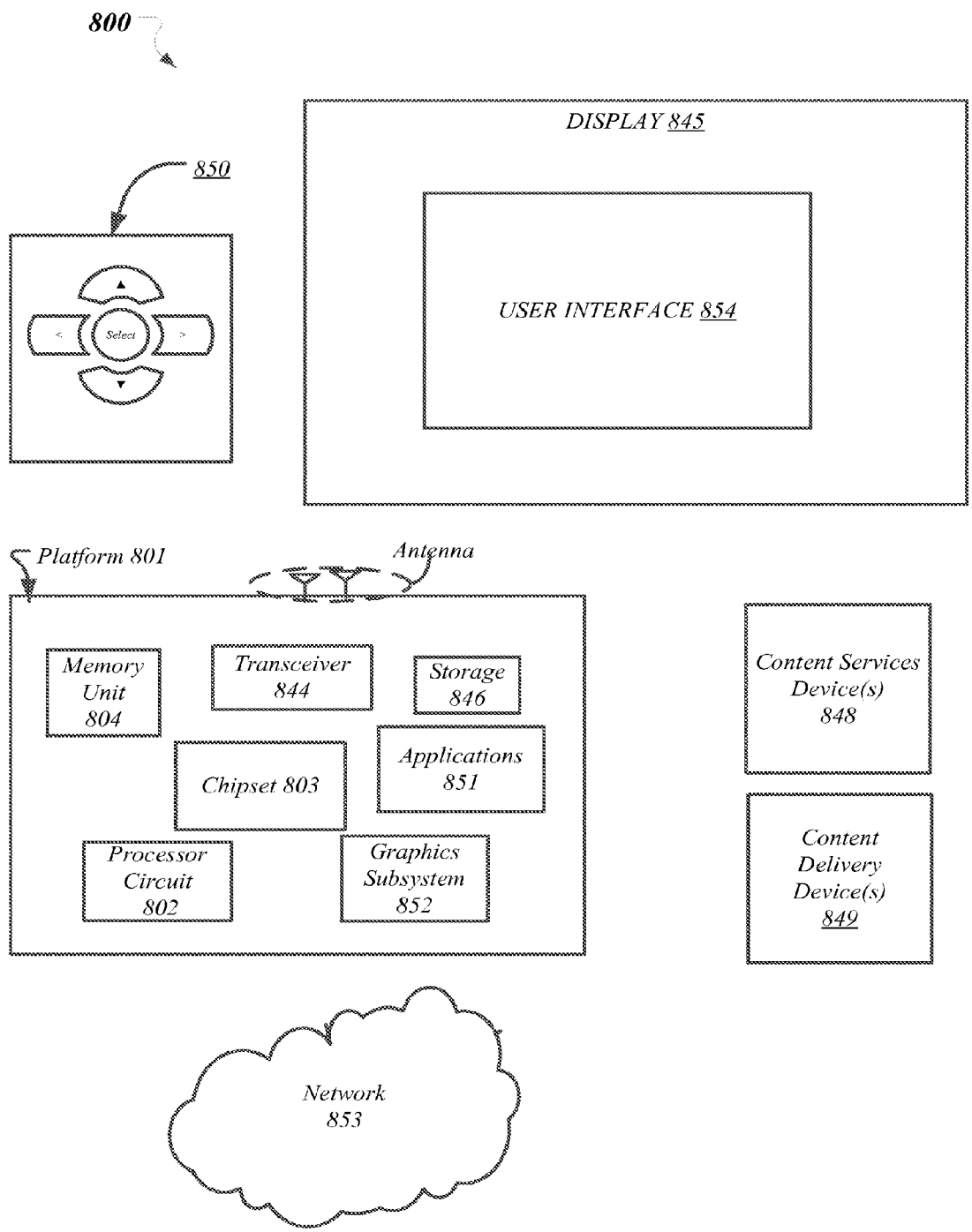
FIG. 8 illustrates one embodiment of a third system.

FIG. 8 illustrates an embodiment of a system 800. In various embodiments, system 800 may be representative of a system or architecture suitable for use with one or more embodiments described herein, such as device 300 of FIG. 3, logic flow 400 of FIG. 4, logic flow 500 of FIG. 5, storage medium 600 of FIG. 6, and/or system 700 of FIG. 7. The embodiments are not limited in this respect.

As shown in FIG. 8, system 800 may include multiple elements. One or more elements may be implemented using one or more circuits, components, registers, processors, software subroutines, modules, or any combination thereof, as desired for a given set of design or performance constraints. Although FIG. 8 shows a limited number of elements in a certain topology by way of example, it can be appreciated that more or less elements in any suitable topology may be used in system 800 as desired for a given implementation. The embodiments are not limited in this context.

In embodiments, system 800 may be a media system although system 800 is not limited to this context. For example, system 800 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, system 800 includes a platform 801 coupled to a display 845. Platform 801 may receive content from a content device such as content services device(s) 848 or content delivery device(s) 849 or other similar content sources. A navigation controller 850 including one or more navigation features may be used to interact with, for example, platform 801 and/or display 845. Each of these components is described in more detail below.

In embodiments, platform 801 may include any combination of a processor circuit 802, chipset 803, memory unit 804, transceiver 844, storage 846, applications 851, and/or graphics subsystem 852. Chipset 803 may provide intercommunication among processor circuit 802, memory unit 804, transceiver 844, storage 846, applications 851, and/or graphics subsystem 852. For example, chipset 803 may include a storage adapter (not depicted) capable of providing intercommunication with storage 846.

Processor circuit 802 may be implemented using any processor or logic device, and may be the same as or similar to processor circuit 702 in FIG. 7.

Memory unit 804 may be implemented using any machine-readable or computer-readable media capable of storing data, and may be the same as or similar to memory unit 704 in FIG. 7.

Transceiver 844 may include one or more radios capable of transmitting and receiving signals using various suitable wireless communications techniques, and may be the same as or similar to transceiver 744 in FIG. 7.

Display 845 may include any television type monitor or display, and may be the same as or similar to display 745 in FIG. 7.

Storage 846 may be implemented as a non-volatile storage device, and may be the same as or similar to storage 746 in FIG. 7.

Graphics subsystem 852 may perform processing of images such as still or video for display. Graphics subsystem 852 may be a graphics processing unit (GPU) or a visual processing unit (VPU), for example. An analog or digital interface may be used to communicatively couple graphics subsystem 852 and display 845. For example, the interface may be any of a High-Definition Multimedia Interface, DisplayPort, wireless HDMI, and/or wireless HD compliant techniques. Graphics subsystem 852 could be integrated into processor circuit 802 or chipset 803. Graphics subsystem 852 could be a stand-alone card communicatively coupled to chipset 803.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

In embodiments, content services device(s) 848 may be hosted by any national, international and/or independent service and thus accessible to platform 801 via the Internet, for example. Content services device(s) 848 may be coupled to platform 801 and/or to display 845. Platform 801 and/or content services device(s) 848 may be coupled to a network 853 to communicate (e.g., send and/or receive) media information to and from network 853. Content delivery device(s) 849 also may be coupled to platform 801 and/or to display 845.

In embodiments, content services device(s) 848 may include a cable television box, personal computer, network, telephone, Internet enabled devices or appliance capable of delivering digital information and/or content, and any other similar device capable of unidirectionally or bidirectionally communicating content between content providers and platform 801 and/display 845, via network 853 or directly. It will be appreciated that the content may be communicated unidirectionally and/or bidirectionally to and from any one of the components in system 800 and a content provider via network 853. Examples of content may include any media information including, for example, video, music, medical and gaming information, and so forth.

Content services device(s) 848 receives content such as cable television programming including media information, digital information, and/or other content. Examples of content providers may include any cable or satellite television or radio or Internet content providers. The provided examples are not meant to limit embodiments of the disclosed subject matter.

In embodiments, platform 801 may receive control signals from navigation controller 850 having one or more navigation features. The navigation features of navigation controller 850 may be used to interact with a user interface 854, for example. In embodiments, navigation controller 850 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of navigation controller 850 may be echoed on a display (e.g., display 845) by movements of a pointer, cursor, focus ring, or other visual indicators displayed on the display. For example, under the control of software applications 851, the navigation features located on navigation controller 850 may be mapped to virtual navigation features displayed on user interface 854. In embodiments, navigation controller 850 may not be a separate component but integrated into platform 801 and/or display 845. Embodiments, however, are not limited to the elements or in the context shown or described herein.

In embodiments, drivers (not shown) may include technology to enable users to instantly turn on and off platform 801 like a television with the touch of a button after initial boot-up, when enabled, for example. Program logic may allow platform 801 to stream content to media adaptors or other content services device(s) 848 or content delivery device(s) 849 when the platform is turned "off." In addition, chip set 803 may include hardware and/or software support for 5.1 surround sound audio and/or high definition 7.1 surround sound audio, for example. Drivers may include a graphics driver for integrated graphics platforms. In embodiments, the graphics driver may include a peripheral component interconnect (PCI) Express graphics card.

In various embodiments, any one or more of the components shown in system 800 may be integrated. For example, platform 801 and content services device(s) 848 may be integrated, or platform 801 and content delivery device(s) 849 may be integrated, or platform 801, content services device(s) 848, and content delivery device(s) 849 may be integrated, for example. In various embodiments, platform 801 and display 845 may be an integrated unit. Display 845 and content service device(s) 848 may be integrated, or display 845 and content delivery device(s) 849 may be integrated, for example. These examples are not meant to limit the disclosed subject matter.

In various embodiments, system 800 may be implemented as a wireless system, a wired system, or a combination of both. When implemented as a wireless system, system 800 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 800 may include components and interfaces suitable for communicating over wired communications media, such as I/O adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 801 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 8.

Figure 9:
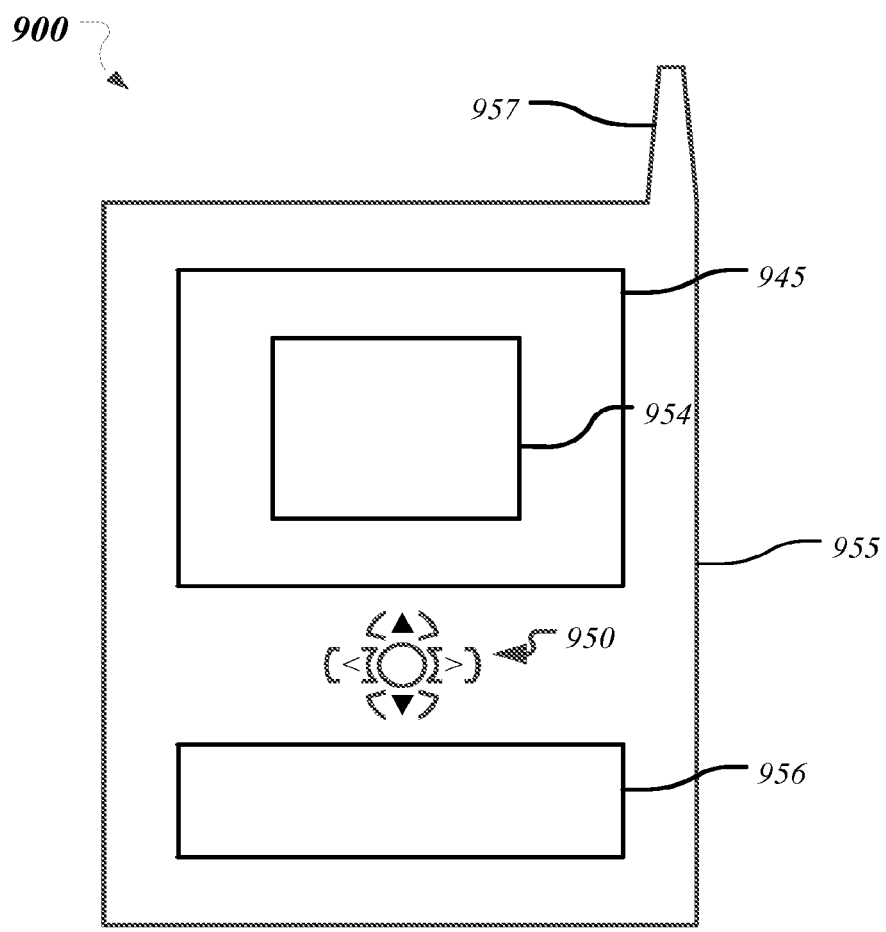
FIG. 9 illustrates one embodiment of a fourth device.

As described above, system 800 may be embodied in varying physical styles or form factors. FIG. 9 illustrates embodiments of a small form factor device 900 in which system 800 may be embodied. In embodiments, for example, device 900 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 9, device 900 may include a display 945, a navigation controller 950, a user interface 954, a housing 955, an I/O device 956, and an antenna 957. Display 945 may include any suitable display unit for displaying information appropriate for a mobile computing device, and may be the same as or similar to display 845 in FIG. 8. Navigation controller 950 may include one or more navigation features which may be used to interact with user interface 954, and may be the same as or similar to navigation controller 850 in FIG. 8. I/O device 956 may include any suitable I/O device for entering information into a mobile computing device. Examples for I/O device 956 may include an alphanumeric keyboard, a numeric keypad, a touch pad, input keys, buttons, switches, rocker switches, microphones, speakers, voice recognition device and software, and so forth. Information also may be entered into device 900 by way of microphone. Such information may be digitized by a voice recognition device. The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The following examples pertain to further embodiments.

Example 1 is at least one machine-readable medium comprising a set of near field communication instructions that, in response to being executed on a computing device, cause the computing device to: receive a host controller protocol (HCP) packet; unwrap the HCP packet to obtain a near field communication controller interface (NCI) packet comprised within the HCP packet; and add the NCI packet to an NCI firmware stack.

In Example 2, the at least one machine-readable medium of Example 1 may optionally comprise instructions that, in response to being executed on the computing device, cause the computing device to unwrap the HCP packet using a tunneling module comprising a proprietary host controller interface (HCI) gate or a generic HCI gate.

In Example 3, the at least one machine-readable medium of any one of Examples 1 to 2 may optionally comprise instructions that, in response to being executed on the computing device, cause the computing device to receive the HCP packet over a single wire protocol (SWP) connection.

In Example 4, the at least one machine-readable medium of Example 3 may optionally comprise instructions that, in response to being executed on the computing device, cause the computing device to automatically activate the SWP connection.

In Example 5, the at least one machine-readable medium of any one of Examples 1 to 4 may optionally comprise instructions that, in response to being executed on the computing device, cause the computing device to receive the HCP packet from a secure element (SE).

In Example 6, the SE of Example 5 may optionally comprise an embedded secure element (eSE), a universal integrated circuit card (UICC), or a secure digital (SD) card.

In Example 7, the tunneling module of Example 2 may optionally support one or more generic HCP command sets.

In Example 8, the one or more generic HCP command sets of Example 7 may optionally comprise one or more of an ANY_SET/GET_PARAMETER command set, an ANY_OPEN/CLOSE_PIPE command set, and an EVT_POST_DATA command set.

In Example 9, the NCI packet of any one of Examples 1 to 8 may optionally originate from an application processor (AP).

In Example 10, the at least one machine-readable medium of Example 5, may optionally comprise instructions that, in response to being executed on the computing device, cause the computing device to: generate a second NCI packet; wrap the second NCI packet within a second HCP packet; and send the second HCP packet to the SE.

Example 11 is a near field communication (NFC) controller, comprising: a single wire protocol (SWP) module to receive a host controller protocol (HCP) packet; and host controller interface (HCI) firmware comprising a tunneling module to unwrap the HCP packet to obtain a near field communication controller interface (NCI) packet comprised within the HCP packet.

In Example 12, the NFC controller of Example 11 may optionally comprise an NCI firmware stack, and the HCI firmware may optionally forward the NCI packet to the NCI firmware stack.

In Example 13, the tunneling module of any one of Examples 11 to 12 may optionally comprise a proprietary HCI gate or a generic HCI gate.

In Example 14, the SWP module of any one of Examples 11 to 13 may optionally automatically activate an SWP connection and receive the HCP packet over the SWP connection.

In Example 15, the SWP module of any one of Examples 11 to 14 may optionally receive the HCP packet from a secure element (SE).

In Example 16, the SE of Example 15 may optionally comprise an embedded secure element (eSE), a universal integrated circuit card (UICC), or a secure digital (SD) card.

In Example 17, the tunneling module of any one of Examples 11 to 16 may optionally support one or more generic HCP command sets.

In Example 18, the one or more generic HCP command sets of Example 17 may optionally comprise one or more of an ANY_SET/GET_PARAMETER command set, an ANY_OPEN/CLOSE_PIPE command set, and an EVT_POST_DATA command set.

In Example 19, the NCI packet of any one of Examples 11 to 18 may optionally originate from an application processor (AP).

In Example 20, the HCI firmware of Example 15 may optionally receive a second NCI packet, the tunneling module may optionally wrap the second NCI packet within a second HCP packet, and the SWP module may optionally send the second HCP packet to the SE.

Example 21 is a wireless communications device comprising: an NFC controller according to any one of Examples 11 to 20, coupled to at least one radio frequency (RF) antenna to receive data from a remote device via an RF connection established using an NFC protocol.

Example 22 is a near field communication method, comprising: receiving, by a near field communication (NFC) controller comprising an NFC controller interface (NCI) firmware stack, a host controller protocol (HCP) packet; decapsulating the HCP packet to obtain an NCI packet comprised within the HCP packet; and adding the NCI packet to the NCI firmware stack.

In Example 23, the near field communication method of Example 22 may optionally comprise decapsulating the HCP packet using a tunneling module comprising a proprietary host controller interface (HCI) gate or a generic HCI gate.

In Example 24, the near field communication method of any one of Examples 22 to 23 may optionally comprise receiving the HCP packet over a single wire protocol (SWP) connection.

In Example 25, the near field communication method of Example 24 may optionally comprise automatically activating the SWP connection.

In Example 26, the near field communication method of any one of Examples 22 to 25 may optionally comprise receiving the HCP packet from a secure element (SE).

In Example 27, the SE of Example 26 may optionally comprise an embedded secure element (eSE), a universal integrated circuit card (UICC), or a secure digital (SD) card.

In Example 28, the tunneling module of Example 23 may optionally support one or more generic HCP command sets.

In Example 29, the one or more generic HCP command sets of Example 28 may optionally comprise one or more of an ANY_SET/GET_PARAMETER command set, an ANY_OPEN/CLOSE_PIPE command set, and an EVT_POST_DATA command set.

In Example 30, the NCI packet of Example 22 may optionally originate from an application processor (AP).

In Example 31, the near field communication method of Example 26 may optionally comprise: generating a second NCI packet; encapsulating the second NCI packet within a second HCP packet; and sending the second HCP packet to the SE.

Example 32 is an apparatus, comprising means for performing a near field communication method according to any one of Examples 22 to 31.

Example 33 is a wireless communications device arranged to perform a near field communication method according to any one of Examples 22 to 31.

Example 34 is a wireless communication device, comprising: a processor circuit; an application processor (AP) for execution on the processor circuit to generate a near field communication controller interface (NCI) packet; a secure element (SE) to wrap the NCI packet in a host controller protocol (HCP) packet; and a near field communication (NFC) controller to receive the HCP packet, the NFC controller comprising a tunneling module to obtain the NCI packet by unwrapping the HCP packet.

In Example 35, the NFC controller of Example 34 may optionally add the NCI packet to an NCI firmware stack.

In Example 36, the AP of any one of Examples 34 to 35 may optionally wrap the NCI packet in an application data protocol unit (APDU) and send the APDU to the SE.

In Example 37, the AP of Example 36 may optionally send the APDU to the SE over a serial protocol interface (SPI) connection.

In Example 38, the SE of any one of Examples 36 to 37 may optionally unwrap the APDU to obtain the NCI packet.

In Example 39, the SE of any one of Examples 34 to 38 may optionally send the HCP packet to the NFC controller over a single wire protocol (SWP) connection.

In Example 40, the tunneling module of any one of Examples 34 to 39 may optionally comprise a proprietary host controller interface (HCI) gate or a generic HCI gate.

In Example 41, the SE of any one of Examples 34 to 40 may optionally comprise an embedded secure element (eSE), a universal integrated circuit card (UICC), or a secure digital (SD) card.

In Example 42, the SE of any one of Examples 34 to 41 may optionally comprise a second tunneling module to wrap the NCI packet in the HCP packet.

In Example 43, the NFC controller of any one of Examples 34 to 42 may optionally generate a second NCI packet, wrap the second NCI packet in a second HCP packet, and send the second HCP packet to the SE.

In Example 44, the SE of Example 43 may optionally unwrap the second HCP packet to obtain the second NCI packet, wrap the second NCI packet in an application data protocol unit (APDU), and send the APDU to the AP.

Example 45 is a system, comprising: a wireless communication device according to any one of Examples 34 to 44; and at least one radio frequency (RF) antenna to receive data from a remote device via an RF connection established using an NFC protocol.

Example 46 is a near field communication method, comprising: generating, by an application processor (AP) executing on a processor circuit, a near field communication controller interface (NCI) packet; wrapping the NCI packet in a host controller protocol (HCP) packet at a secure element (SE); and obtaining the NCI packet at a near field communication (NFC) controller by unwrapping the HCP packet using a tunneling module.

In Example 47, the near field communication method of Example 46 may optionally comprise adding the NCI packet to an NCI firmware stack at the NFC controller.

In Example 48, the near field communication method of any one of Examples 46 to 47 may optionally comprise: wrapping the NCI packet in an application data protocol unit (APDU) at the AP; and sending the APDU from the AP to the SE.

In Example 49, the near field communication method of Example 48 may optionally comprise sending the APDU from the AP to the SE over a serial protocol interface (SPI) connection.

In Example 50, the near field communication method of any one of Examples 48 to 49 may optionally comprise unwrapping the APDU at the SE to obtain the NCI packet.

In Example 51, the near field communication method of any one of Examples 46 to 50 may optionally comprise sending the HCP packet from the SE to the NFC controller over a single wire protocol (SWP) connection.

In Example 52, the tunneling module of any one of Examples 46 to 51 may optionally comprise a proprietary host controller interface (HCI) gate or a generic HCI gate.

In Example 53, the SE of any one of Examples 46 to 52 may optionally comprise an embedded secure element (eSE), a universal integrated circuit card (UICC), or a secure digital (SD) card.

In Example 54, the near field communication method of any one of Examples 46 to 53 may optionally comprise wrapping the NCI packet in the HCP packet using a second tunneling module at the SE.

In Example 55, the near field communication method of any one of Examples 46 to 54 may optionally comprise: generating a second NCI packet at the NFC controller; wrapping the second NCI packet in a second HCP packet; and sending the second HCP packet to the SE.

In Example 56, the near field communication method of Example 55 may optionally comprise: unwrapping the second HCP packet at the SE to obtain the second NCI packet; wrapping the second NCI packet in an application data protocol unit (APDU); and sending the APDU to the AP.

Example 57 is at least one machine-readable medium comprising a set of instructions that, in response to being executed on a computing device, cause the computing device to perform a near field communication method according to any one of Examples 46 to 56.

Example 58 is an apparatus, comprising: means for performing a near field communication method according to any one of Examples 46 to 56.

Example 59 is a system, comprising: an apparatus according to Example 58; and at least one radio frequency (RF) antenna to receive data from a remote device via an RF connection established using an NFC protocol.

Example 60 is a wireless communications device arranged to perform a near field communication method according to any one of Examples 46 to 56.

Numerous specific details have been set forth herein to provide a thorough understanding of the embodiments. It will be understood by those skilled in the art, however, that the embodiments may be practiced without these specific details. In other instances, well-known operations, components, and circuits have not been described in detail so as not to obscure the embodiments. It can be appreciated that the specific structural and functional details disclosed herein may be representative and do not necessarily limit the scope of the embodiments.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A wireless communication device, comprising:
   a processor circuit;
   an application processor (AP) for execution on the processor circuit to generate a near field communication controller interface (NCI) packet;
   a secure element (SE) to receive the NCI packet from the AP and wrap the NCI packet in a host controller protocol (HCP) packet; and
   a near field communication (NFC) controller to receive the HCP packet from the SE, the NFC controller comprising a tunneling module to obtain the NCI packet by unwrapping the HCP packet.

2. The wireless communication device of claim 1, the NFC controller to add the NCI packet to an NCI firmware stack.

3. The wireless communication device of claim 1, the AP to wrap the NCI packet in an application data protocol unit (APDU) and send the APDU to the SE.

4. The wireless communication device of claim 3, the AP to send the APDU to the SE over a serial protocol interface (SPI) connection.

5. The wireless communication device of claim 3, the SE to unwrap the APDU to obtain the NCI packet.

6. The wireless communication device of claim 1, the SE to send the HCP packet to the NFC controller over a single wire protocol (SWP) connection.

7. The wireless communication device of claim 1, the tunneling module comprising a proprietary host controller interface (HCI) gate or a generic HCI gate.

8. The wireless communication device of claim 1, the SE comprising an embedded secure element (eSE), a universal integrated circuit card (UICC), or a secure digital (SD) card.

9. The wireless communication device of claim 1, the SE comprising a second tunneling module to wrap the NCI packet in the HCP packet.

10. The wireless communication device of claim 1, the NFC controller to generate a second NCI packet, wrap the second NCI packet in a second HCP packet, and send the second HCP packet to the SE.

11. The wireless communication device of claim 10, the SE to unwrap the second HCP packet to obtain the second NCI packet, wrap the second NCI packet in an application data protocol unit (APDU), and send the APDU to the AP.

12. The wireless communication device of claim 1, comprising at least one radio frequency (RF) antenna to receive data from a remote device via an RF connection established using an NFC protocol.

13. A method, comprising:
   generating, by an application processor (AP) executing on a processor circuit, a near field communication controller interface (NCI) packet;
   wrapping the NCI packet in a host controller protocol (HCP) packet at a secure element (SE), the SE arranged to receive the NCI packet from the AP; and
   obtaining the NCI packet at a near field communication (NFC) controller by unwrapping the HCP packet using a tunneling module, the NFC controller arranged to receive the HCP packet from the SE.

14. The method of claim 13, comprising:
   wrapping the NCI packet in an application data protocol unit (APDU) at the AP; and
   sending the APDU from the AP to the SE.

15. The method of claim 14, comprising unwrapping the APDU at the SE to obtain the NCI packet.

16. The method of claim 13, the tunneling module comprising a proprietary host controller interface (HCI) gate or a generic HCI gate.

17. The method of claim 13, the SE comprising an embedded secure element (eSE), a universal integrated circuit card (UICC), or a secure digital (SD) card.

18. The method of claim 13, comprising:
   generating a second NCI packet at the NFC controller;
   wrapping the second NCI packet in a second HCP packet; and
   sending the second HCP packet to the SE.

19. The method of claim 18, comprising:
unwrapping the second HCP packet at the SE to obtain the second NCI packet;
wrapping the second NCI packet in an application data protocol unit (APDU); and
sending the APDU to the AP.

20. At least one non-transitory machine-readable medium comprising a set of instructions that, in response to being executed on a computing device, cause the computing device to:
generate, by an application processor (AP) executing on a processor circuit, a near field communication controller interface (NCI) packet;
wrap the NCI packet in a host controller protocol (HCP) packet at a secure element (SE), the SE arranged to receive the NCI packet from the AP; and
obtain the NCI packet at a near field communication (NFC) controller by unwrapping the HCP packet using a tunneling module, the NFC controller arranged to receive the HCP packet form the SE.

21. The at least one non-transitory machine-readable medium of claim 20, comprising instructions that, in response to being executed on the computing device, cause the computing device to:
wrap the NCI packet in an application data protocol unit (APDU) at the AP; and
send the APDU from the AP to the SE.

22. The at least one non-transitory machine-readable medium of claim 21, comprising instructions that, in response to being executed on the computing device, cause the computing device to unwrap the APDU at the SE to obtain the NCI packet.

23. The at least one non-transitory machine-readable medium of claim 20, the tunneling module comprising a proprietary host controller interface (HCI) gate or a generic HCI gate.

24. The at least one non-transitory machine-readable medium of claim 20, comprising instructions that, in response to being executed on the computing device, cause the computing device to:
generate a second NCI packet at the NFC controller;
wrap the second NCI packet in a second HCP packet; and
send the second HCP packet to the SE.

25. The at least one non-transitory machine-readable medium of claim 24, comprising instructions that, in response to being executed on the computing device, cause the computing device to:
unwrap the second HCP packet at the SE to obtain the second NCI packet;
wrap the second NCI packet in an application data protocol unit (APDU); and
send the APDU to the AP.

\* \* \* \* \*